United States Patent
Dunneback et al.

(10) Patent No.: US 7,416,247 B2
(45) Date of Patent: Aug. 26, 2008

(54) RETRACTABLE VEHICLE ROOF SYSTEM

(75) Inventors: Mark R. Dunneback, Macomb Township, MI (US); James P. Mantua, Beverly Hills, MI (US); Nicholas Vardis, Sylvan Lake, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/611,187

(22) Filed: Dec. 15, 2006

(65) Prior Publication Data

US 2008/0143151 A1   Jun. 19, 2008

(51) Int. Cl.
  *B60J 7/06* (2006.01)
(52) U.S. Cl. ............... 296/219; 296/186.2; 296/146.1; 296/100.11
(58) Field of Classification Search ............ 296/219, 296/214, 99.1, 100.11, 105, 107.14, 26.09, 296/107.18, 155, 216.04, 186.2
  See application file for complete search history.

(56) References Cited

U.S. PATENT DOCUMENTS

| | | | | |
|---|---|---|---|---|
| 3,348,877 | A * | 10/1967 | Caramanna | 135/88.09 |
| 4,925,238 | A * | 5/1990 | Thaler | 296/218 |
| 5,941,592 | A | 8/1999 | Hausrath | |
| 5,966,883 | A | 10/1999 | Krusec et al. | |
| 6,105,324 | A | 8/2000 | Krusec et al. | |
| 6,588,824 | B2 * | 7/2003 | Neubrand | 296/99.1 |
| 6,758,517 | B1 * | 7/2004 | Raasakka | 296/214 |
| 6,817,654 | B2 | 11/2004 | Kitagawa et al. | |
| 6,827,392 | B2 | 12/2004 | Doncov et al. | |
| 6,890,022 | B2 | 5/2005 | Doncov et al. | |
| 6,913,306 | B2 | 7/2005 | Rosler et al. | |
| 6,918,629 | B2 | 7/2005 | Nellen et al. | |
| 6,926,354 | B2 | 8/2005 | Munsters | |
| 6,945,590 | B2 | 9/2005 | Doncov et al. | |
| 7,008,009 | B2 * | 3/2006 | Grimm et al. | 296/214 |
| 7,021,242 | B2 | 4/2006 | Axelrod | |
| 7,025,019 | B2 | 4/2006 | Axelrod et al. | |
| 7,051,413 | B2 | 5/2006 | Camacho et al. | |
| 7,055,453 | B2 | 6/2006 | Miotto et al. | |
| 7,063,372 | B2 | 6/2006 | Manders et al. | |
| 7,080,867 | B2 | 7/2006 | Woerner et al. | |
| 2007/0102967 | A1 * | 5/2007 | Reitzloff et al. | 296/219 |

FOREIGN PATENT DOCUMENTS

FR    635826    *  3/1928    ................ 296/219

* cited by examiner

*Primary Examiner*—Dennis H Pedder
(74) *Attorney, Agent, or Firm*—Ralph E. Smith

(57) ABSTRACT

A closure system for a vehicle includes a closure member movable relative to the vehicle between an open position and a closed position. The closure member includes a flexible panel and a plurality of support members supporting the flexible panel. A first support member is attached to and is movable with the closure member between the open position and the closed position. The first support member includes a recess receiving the flexible panel and the plurality of support members therein when the closure member is in the open position.

5 Claims, 10 Drawing Sheets

RETRACTABLE VEHICLE ROOF SYSTEM

FIELD OF THE INVENTION

The present invention relates to closure systems and more particularly to closure systems for vehicles.

BACKGROUND OF THE INVENTION

Closure systems for vehicles typically include at least one panel that is movable relative to a vehicle between an open position and a closed position to selectively close an opening of the vehicle. In the open position, the panel exposes an interior compartment of the vehicle while in the closed position the panel seals the interior compartment generally preventing entry of debris such as snow and rain.

While conventional closure systems adequately move between an open position and a closed position to selectively expose an interior compartment of a vehicle, conventional closure systems suffer from the disadvantage of requiring storage of the closure panel when the closure panel is in the open position. For example, a conventional sunroof panel must be stored between an outer panel of a vehicle (i.e., a roof panel, for example) and a headliner of the vehicle when the sunroof panel is in the open position. Storing the sunroof panel between the outer panel of the vehicle and the headliner necessarily requires a sufficient amount of space between the outer panel and the headliner to accommodate the sunroof panel, which increases the overall height of the vehicle and/or reduces the size of the interior compartment In addition to retractable panels such as sunroofs, conventional closure systems may also include closure panels that are selectively removable from a vehicle when in the open position. Such conventional systems include hard-top systems and T-top systems. In either system, closure panels of the vehicle may be selectively removed from the vehicle to expose a passenger compartment of the vehicle. While removal of such panels adequately exposes a passenger compartment of the vehicle, removal of the closure panels requires storage of the closure panels either within a storage space of the vehicle (i.e., a trunk, for example) or in a space external from the vehicle, Storing the closure panel within the vehicle consumes available storage space and therefore diminishes the overall utility of the vehicle. Similarly, storing the closure panel in a space exterior from the vehicle such as, for example, a garage, increases the likelihood that the panels may become damaged during movement and/or storage and also prevents a user from returning the closure panels to a closed position when the vehicle is driven away from the storage space. Storing such hard-top closure panels either within the vehicle or external from the vehicle results in complexity for the user and a diminished utility of the vehicle.

SUMMARY OF THE INVENTION

In one aspect, the present invention provides a closure system for a vehicle including a first support member movable relative to the vehicle and a first closure member attached to the first support member. The first closure member is selectively movable relative to the vehicle with the first support member between an open position and a closed position and is received within the first support member in the open position. A second support member is movable relative to the vehicle and a second closure member is attached to the second support member. The second closure member is selectively movable relative to the vehicle with the second support member between an open position and a closed position and is received within the second support member in the open position.

In another aspect, the present invention provides a closure system for a vehicle including a closure member movable relative to the vehicle between an open position and a closed position. The closure member includes a flexible panel and a plurality of support members supporting the flexible panel. A first support member is attached to and is movable with the closure member between the open position and the closed position. The first support member includes a recess receiving the flexible panel and the plurality of support members therein when the closure member is in the open position.

In yet another aspect, the present invention provides a vehicle including a closure member movable relative to the vehicle between an open position and a closed position. The closure member includes a flexible panel and a plurality of support members supporting the flexible panel. A first support member is attached to and is movable with the closure member between the open position and the closed position. The first support member includes a recess receiving the flexible panel and the plurality of support members therein when the closure member is in the open position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
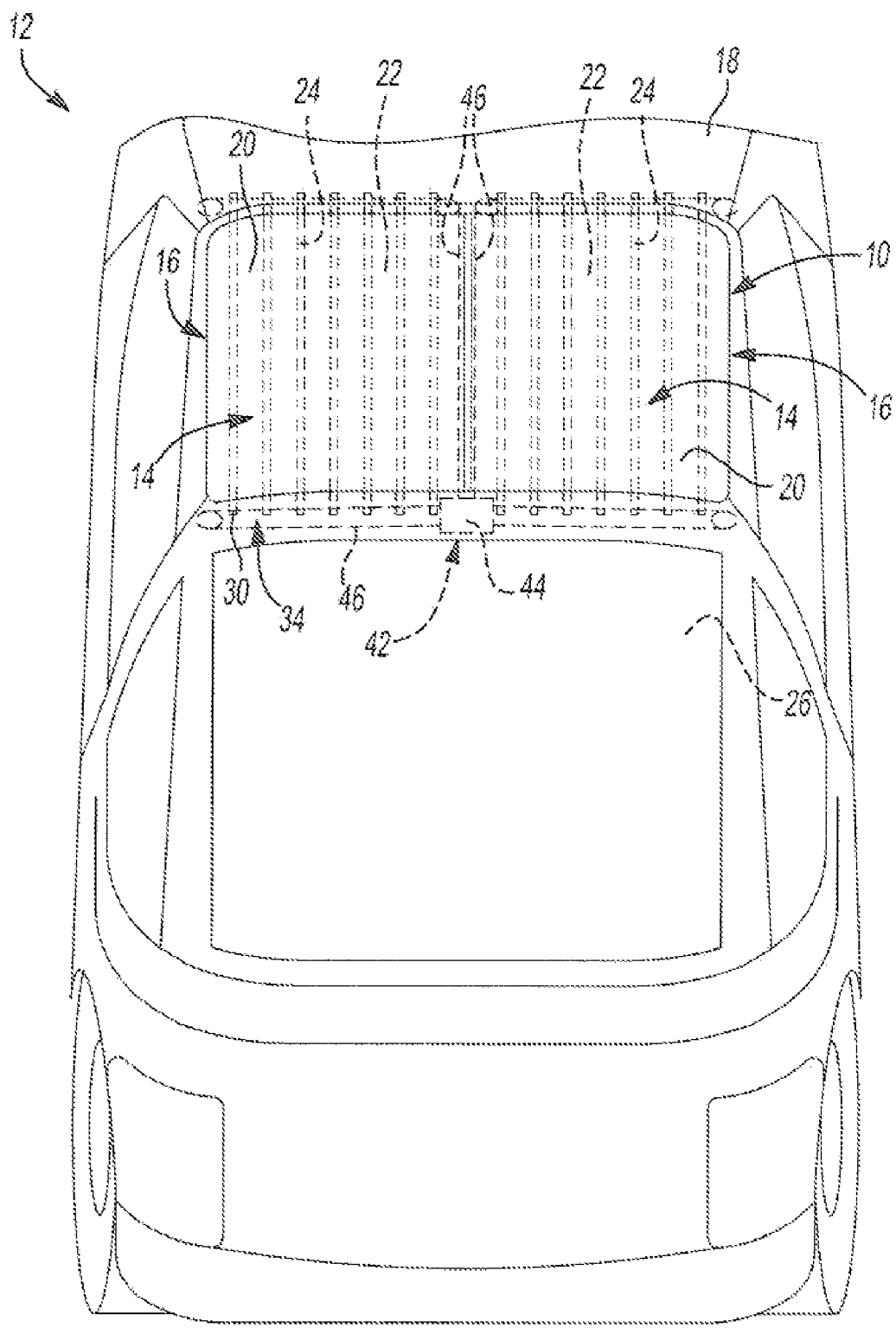
FIG. 1 is a perspective view of a vehicle including a closure system in accordance with the principles of the present invention.
Figure 2:
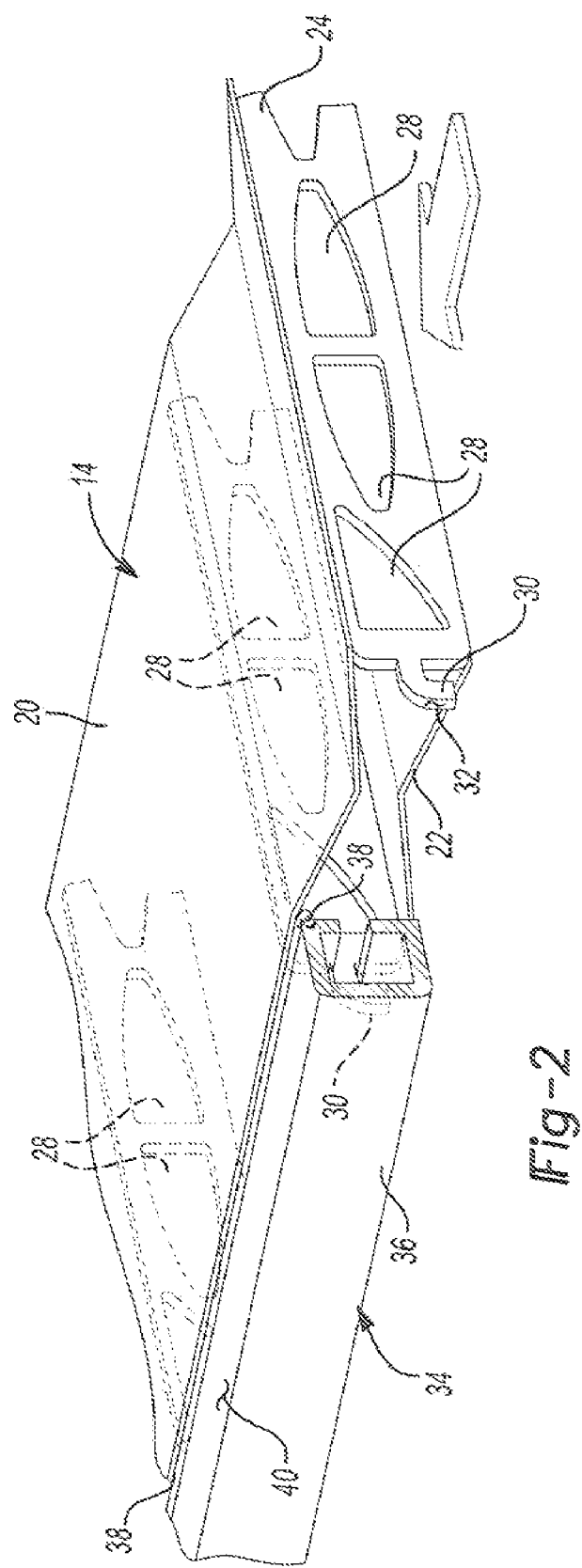
FIG. 2 is a perspective view of a closure panel of the closure system of FIG. 1 showing an internal structure of the closure panel.

The following description of the preferred embodiment(s) is merely exemplary in nature and is in no way intended to limit the invention, its application, or uses.

With reference to the figures, a closure system 10 for a vehicle 12 is provided and includes at least one closure panel 14 having a pair of support members 16 attached thereto. The closure panel 14 may be moved between an open position and a closed position relative to the vehicle 12. Because the support members 16 are attached to the closure panel 14, movement of the closure panel 14 between the open position and the closed position similarly causes movement of the support members 16 relative to the vehicle 12. While the closure system 10 of the present invention may be used in any configuration and in any location of a vehicle 12 to selectively open and close an opening of the vehicle 12, the closure system 10 will be described and shown hereinafter as including a single closure panel 14 and a pair of support members 16 that are disposed generally on a roof 18 of the vehicle 12.

Figure 6:
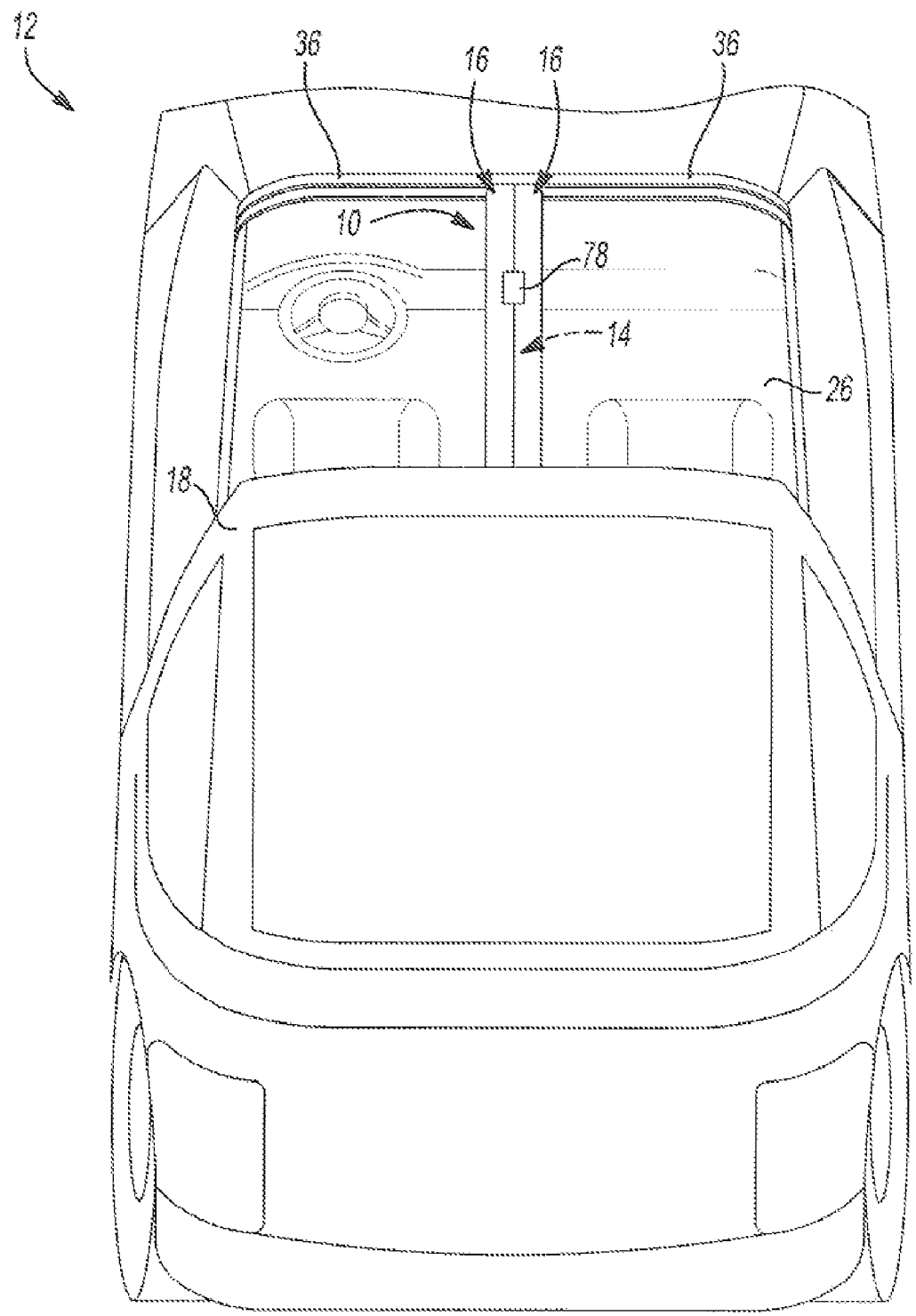
FIG. 6 is a perspective view of the vehicle of FIG. 1 with a pair of closure panels of the closure system in an open position.

The closure panel 14 may be movable relative to the vehicle 12 between a closed position (FIG. 1) and an open position (FIG. 6) and may include a top panel 20, a bottom panel 22, and a plurality of structural supports 24 extending generally between the top panel 20 and the bottom panel 22. The top panel 20 and the bottom panel 22 may be formed of a flexible material such as canvas or nylon to allow the top panel 20 and bottom panel 22 to be folded into an accordion shape when moved from the closed position to the open position. Furthermore, the top panel 20 and bottom panel 22 may also be formed of a transparent or translucent material to permit visibility through the top panel 20 and bottom panel 22 when the top panel 20 and bottom panel 22 are in the closed position and/or to permit light to enter an interior compartment 26 of the vehicle 12 when the top panel 20 and bottom panel 22 are in the closed position. Providing the fop panel 20 and bottom panel 22 with a translucent or transparent material also exposes the plurality of structural supports 24 that extend between the top panel 20 and bottom panel 22, which may improve the overall aesthetics of the closure panel 14.

While the top panel 20 is described as including a flexible material and/or a translucent or transparent material, the top panel 20 may also include a feature that allows the top panel 20 to repel debris from entering the interior compartment 26 of the vehicle 12. Because the vehicle 12 is exposed to the elements (i.e., ice, snow, rain, etc.), the top panel 20 may be formed of a material that repels water. Furthermore, the top panel 20 may also be formed of a material that prevents the intrusion of wind into the interior compartment 26 to maintain the interior compartment 26 free from noise associated with gusts of wind.

Because the bottom panel 22 generally opposes the interior compartment 26 of the vehicle 12, the bottom panel 22 does not need to be formed of a material that repels wafer. However, the bottom panel 22 may be formed of a material that repels water to further prevent any water or other debris that passes through the top panel 20 from entering the interior compartment 26 of the vehicle 12. The bottom panel 22 may also include a sound-absorbing material to improve the overall acoustics of the interior compartment 26 and to prevent exterior noise from passing through the closure panel 14 and into the interior compartment 26 of the vehicle 12.

When the closure panel 14 is in the closed position, the top panel 20 and bottom panel 22 are generally placed under tension such that the top panel 20 creates a smooth outer contour of the vehicle roof 18. Similarly, when the bottom panel 22 is in the closed position and is placed under tension, the bottom panel 22 creates a generally smooth interior contour that opposes the interior compartment 26 of the vehicle 12. When the closure panel 14 is moved from the open position to the closed positions the top panel 20 and the bottom panel 22 may be folded relative to one another. In one configuration, the top panel 20 and bottom panel 22 may be folded into an accordion shape to allow the top panel 20 and bottom panel 22 to be stored generally within at least one of the support members 16.

The structural supports 24 are disposed generally between the top panel 20 and bottom panel 22 and cooperate with the top panel 20 and bottom panel 22 to define the overall shape of the closure panel 14 when in either the open position or the closed position. Each structural support 24 may include a series of apertures 28 and a pair of extensions 30. The apertures 28 reduce the overall weight of each structural support 24 to thereby reduce the weight of the closure panel 14 and improve the overall functionality of the closure system 10.

If the top panel 20 and/or bottom panel 22 are formed from either a transparent material or a translucent material, forming apertures 28 in the structural supports 24 also provides the structural supports 24 with the ability to allow light to pass through each structural support 24 and into the interior compartment 26 of the vehicle 12 when the closure panel 14 is in the closed position. Furthermore, the shape and pattern of the apertures 28 may provide each structural support 24 with an aesthetically pleasing design.

The extensions 30 may be disposed on opposite ends of each structural support 24 and may include an engagement surface 32. The extensions 30 may be received by a track system 34 that permits movement of the structural supports 24 relative to the vehicle roof 18. Specifically, the extensions 30 of each structural support 24 may be slidably received within a track 36 of the track system 34 such that the engagement surface 32 of each structural support 24 slidably engages at least a portion of the track 36. Engagement between the engagement surface 32 and the track 36 permits movement of the structural supports 24 relative to the track 36 and therefore permits movement of the top panel 20 and bottom panel 22 relative to the vehicle roof 18 to allow the closure panel 14 to be moved between the closed position and the open position.

While the structural supports 24 are described and shown as including a pair of extensions 30 slidably received within a track 36 of a track system 34, the structural supports 24 may include any structure that permits movement of the structural supports 24 relative to the track 36. For example, each structural support 24 may include a roller (not shown) disposed within the track 36 of the track system: 34 that permits movement of the structural supports 24 relative to and within the track 36.

Attachment of the structural supports 24 to the track system 34 creates a seal between the closure panel 14 and the track system 34 such that any debris (i.e., ice, snow, rain, etc.) received by the top panel 20 is not permitted to enter the interior compartment 26 of the vehicle 12 at the junction between the top panel 20 and track system 34 or between the junction of the structural supports 24 and the track system 34.

Preventing debris from entering the interior compartment 26 of the vehicle 12 may be accomplished by providing a seal 38 disposed along a top surface 40 of the track 36 that is in contact with a bottom surface of the top panel 20 when the closure panel 14 is in the closed position. Engagement between the top panel 20 and the seal 38 prevents debris from entering the interior compartment 26 of the vehicle 12 when the top panel 20 is in contact with the seal 38. A similar seal may be positioned proximate to a bottom portion of the track 36 to similarly seal the bottom panel 22 relative to the track 36 to further prevent intrusion of debris and noise into the interior compartment 26 of the vehicle 12.

An actuation assembly 42 may be associated with the closure system 10 that cycles the closure panel 14 between the open position and the closed position. The actuation assembly 42 may include a motor 44 and a series of cables 46 that cooperate to move the closure panel 14 between the closed position and the open position. The motor 44 may be positioned remotely from the closure system 10 or may be located proximate to the closure system 10, generally proximate to or within the vehicle roof 18. In either configuration, the motor 44 may be in communication with the cables 46 to selectively apply a force to the cables 46 and move the cables 46 relative to the vehicle roof 18. The cables 46 may be attached to an outermost and/or innermost structural support 24 and/or to the respective support members 16 of the closure panel 14 such that when the cables 46 are driven by the motor 44 relative to the vehicle roof 18, the cables 46 apply a force to the closure panel 14 to move the closure panel 14 relative to the vehicle roof 18, For example, if the closure panel 14 is in a closed position, cycling the motor 44 will cause the cables 46 to move relative to the vehicle roof 18 and apply a force to the closure panel 14. Applying a force to the closure panel 14 either at an innermost or outermost structural support 24 or to one of the support members 16 causes the support member(s) 16 and structural support(s) 24 to move relative to the vehicle roof 18. Sufficient movement of the support member(s) 16 and structural support(s) 24 relative to the vehicle roof 18 causes the closure panel 14 to move from the closed position to the open position. Applying either a reverse direction of rotation to the motor 44 to apply a force to a second series of cables 46 may move the closure panel 14 from the open position to the closed position in a similar fashion.

Figure 3A:
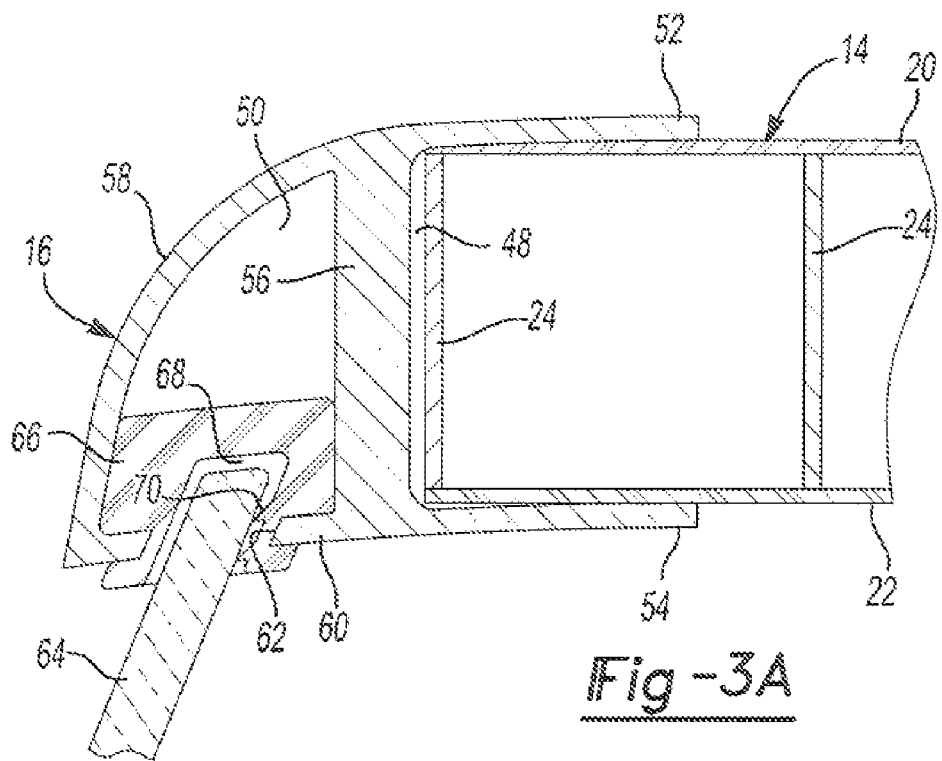
FIG. 3A is a cross-section of a support member of the closure system of FIG. 1 including a glass-channel seal with a pane of glass in a closed position.
Figure 3B:
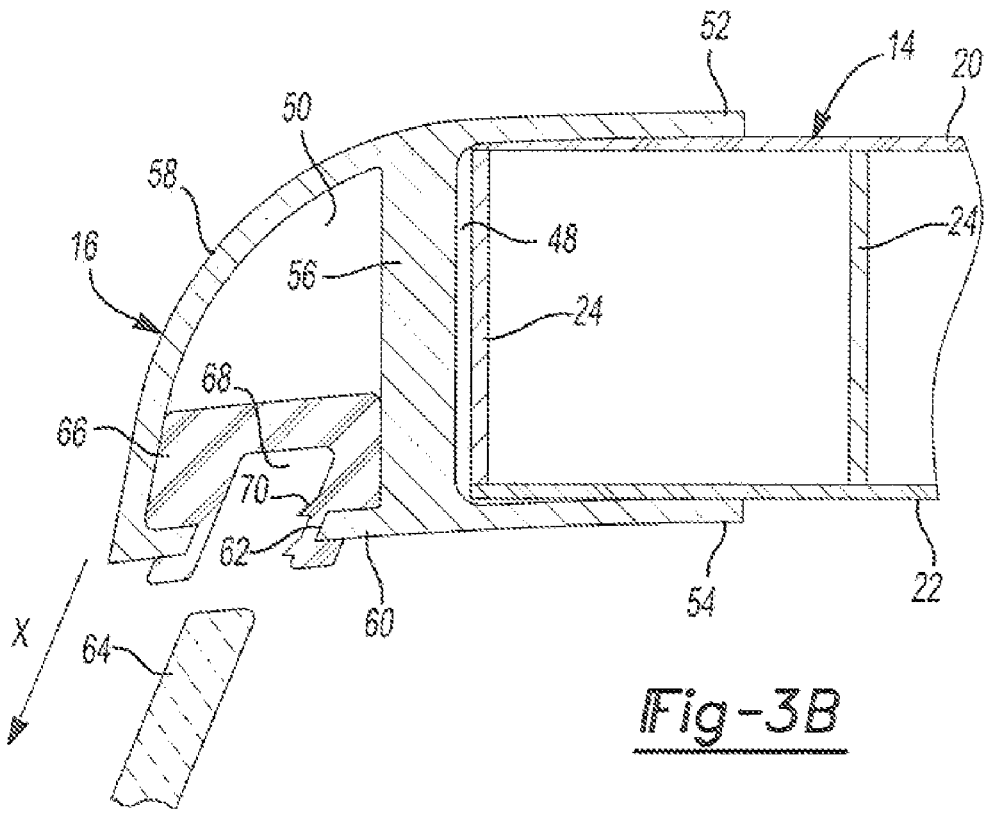
FIG. 3B is a cross-section of a support member of the closure system of FIG. 1 including a glass-channel seal with a pane of glass in an open position.

While a powered system is disclosed, the closure system 10 may additionally or alternatively include a manual system that permits manual movement of the closure panel 14 between the open and closed positions. For example, the closure system 10 may include a manual lever (not shown) that holds the closure panel 14 in the closed position. Upon actuation and release of the manual release lever, a force may be applied to the closure panel 14 and/or support member 16 to move the closure panel 14 and support member 16 relative to the vehicle roof 18 between the open position and the closed position, With particular reference to FIGS. 3A and 3B, the support members 16 are shown to include a channel 48 and a box section 50. The channel 48 includes a top extension 52 and a bottom extension 54, which cooperate with an interior wall 56 of the support member 16 to define the channel 48. As will he described further below, when the closure panel 14 is moved from the open position to the closed position, the closure panel 14 is received within the channel 48 and is disposed generally between the top extension 52 and the bottom extension 54 and adjacent to the interior wall 56.

The box section 50 includes an outer arcuate surface 58 and a bottom surface 60 extending generally between the outer arcuate surface 58 and the interior wall 56. The outer arcuate surface 58 defines a shape of the vehicle roof 18 to provide the vehicle 12 with a streamlined profile. Cooperation between the interior wall 56, outer arcuate surface 58, and bottom surface 60 provide each support member 16 with structure to both support the closure panel 14 as well as to reinforce portions of the vehicle roof 18 that are fore and aft of the closure system 10, thereby improving the overall structure of the vehicle roof 18 and vehicle 12.

The box section 50 may receive a glass panel 64 of the vehicle 12 and may include an aperture 62 formed in the bottom surface 60 that receives a seal 66. The seal 66 may include a recess 68 having a series of projections 70 extending therein. When the glass panel 64 is in a closed position, the glass panel 64 is received generally within the recess 68 of the seal 66 and may engage the projections 70 of the seal 66. Engagement between the glass panel 64 and the projections 70 of the seal 66 provides a seal between the glass panel 84 and the box section 50. Sealing the glass panel 64 to the seal 66 when the glass panel 64 is in a closed position prevents debris (i.e., ice, snow, and rain, etc.) from entering the interior compartment 26 of the vehicle 12. If the glass panel 64 is received within the recess 68 when the glass panel 64 is in a closed position, operation of the closure system 10 may include a system that causes the glass panel 64 to retract from the recess 68 prior to moving the support member(s) 16 from the closed position to the open position to prevent causing damage to the glass panel 64.

For example, the glass panel 64 may include a control system (not shown) that retracts the glass panel 64 from the recess 68 when the closure system 10 is actuated. The control system 10 applies a force in a X direction (FIG. 3B) to remove the glass panel 64 from the recess 68 prior to moving the support member 16 and closure panel(s) 14 relative to the vehicle roof 18. The control system associated with the glass panel 64 may be fled to a control system of the closure system 10 such that actuation of the closure system 10 to move the closure panel 14 and support member(s) 16 from the closed position to the open position or from the open position to the closed position first causes the control system associated with the glass panel 64 to drop the glass panel 64 out of the recess 68 (i.e., if the closure panel 14 is in the closed position) or to drop the glass panel 64 to provide sufficient clearance to move the support member(s) 16 into the closed position (i.e., if the closure panel 14 is in the open position moving toward the closed position).

While the box section 50 is described as including a bottom surface 60 including an aperture 62, the bottom surface 60 may include a solid structure that extends from the outer arcuate surface 58 to the interior wall 56, if the bottom surface 60 of the box section 50 includes a solid structure, a seal 72 may be attached to the bottom surface 60 for interaction with the glass panel 64. The seal 72 may include a bulbous section 74 that selectively compresses when engaged with the glass panel 64. The seal 72 may be received on a projection 76 fixedly attached to or integrally formed with the bottom surface 60 of the box section 50 to reinforce the seal 72.

Figure 5A:
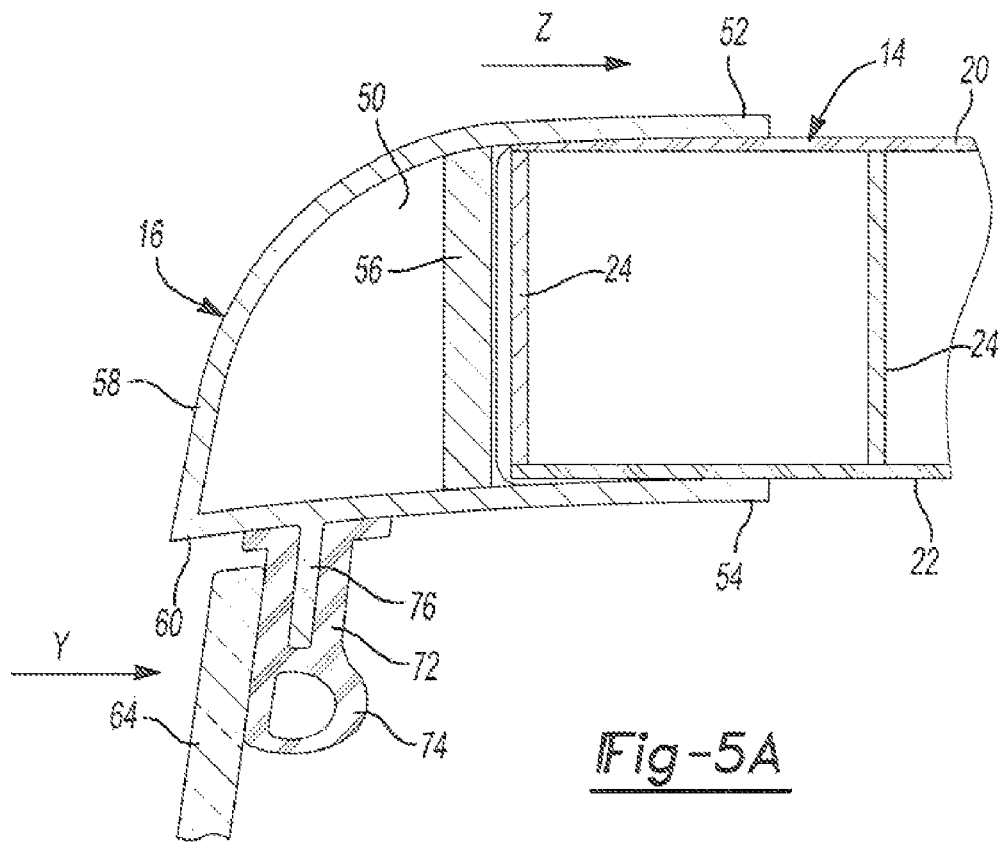
FIG. 5A is a cross-section of a support member of the closure system of FIG. 1 incorporating a compression-type seal with a pane of glass in a closed position.
Figure 5B:
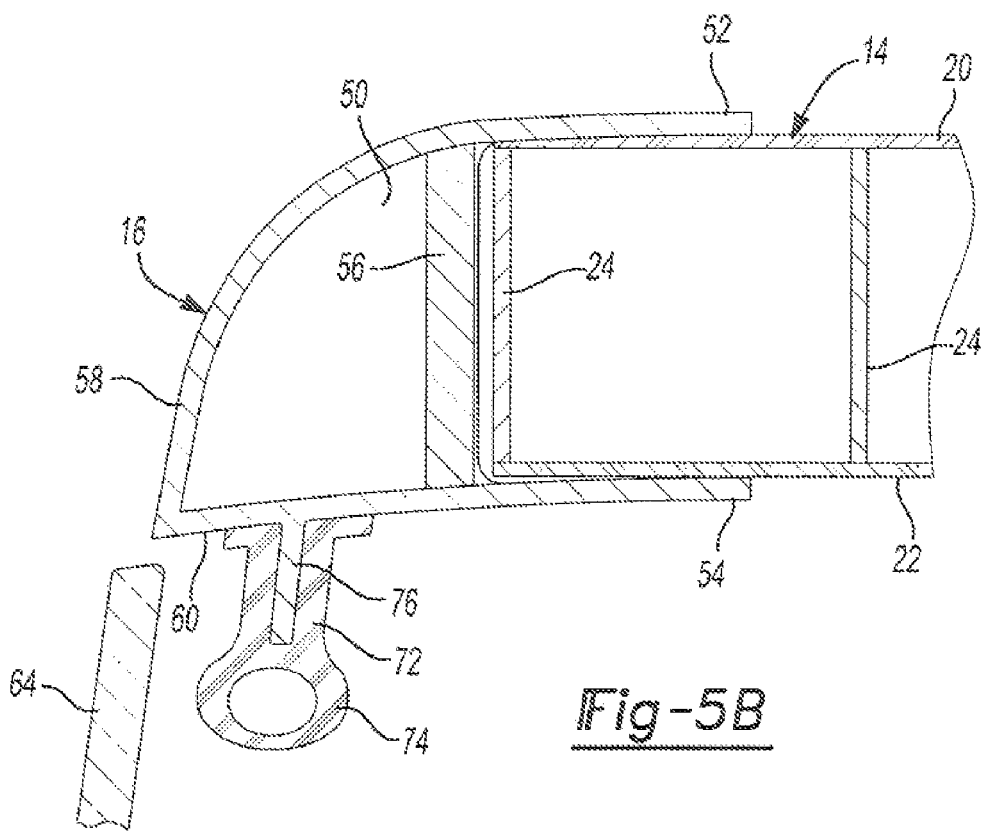
FIG. 5B is a cross-section of a support member of the closure system of FIG. 1 incorporating a compression-type seal with a pane of glass in an open position.

In operation, when the glass panel 64 applies a force to the bulbous section 74 of the seal 72, the bulbous section 74 deforms to create a seal between the glass panel 64 and the box section 50 (FIG. 5A). Because the glass panel 64 applies a force in the Y direction (FIG. 5A), when the support member 16 and closure panel 14 are moved from the closed position to the open position or from the open position to the closed position, movement of the glass panel 64 away from the seal 72 prior to such movement of the support member 16 and closure panel 14 is not necessary. For example, if the closure panel 14 and support member 16 are in the closed position initially, and are actuated to the closed position, the support member(s) 18 moves in a Z direction (FIG. 5A) and away from the seal 72. Sufficient movement of the support member 16 in the Z direction causes the seal 72 to disengage the glass panel 64 (FIG. 5B). Conversely, if the closure panel 14 and support members 16 are initially in the open position and are actuated into the closed position, sufficient movement of the support member(s) 16 from the open position to the closed position will cause the seal 72 to abut the glass panel 64, thereby causing the bulbous section 74 of the seal 72 to deflect and once again establish a seal between the glass panel 64 and the box section 50.

Figure 4:
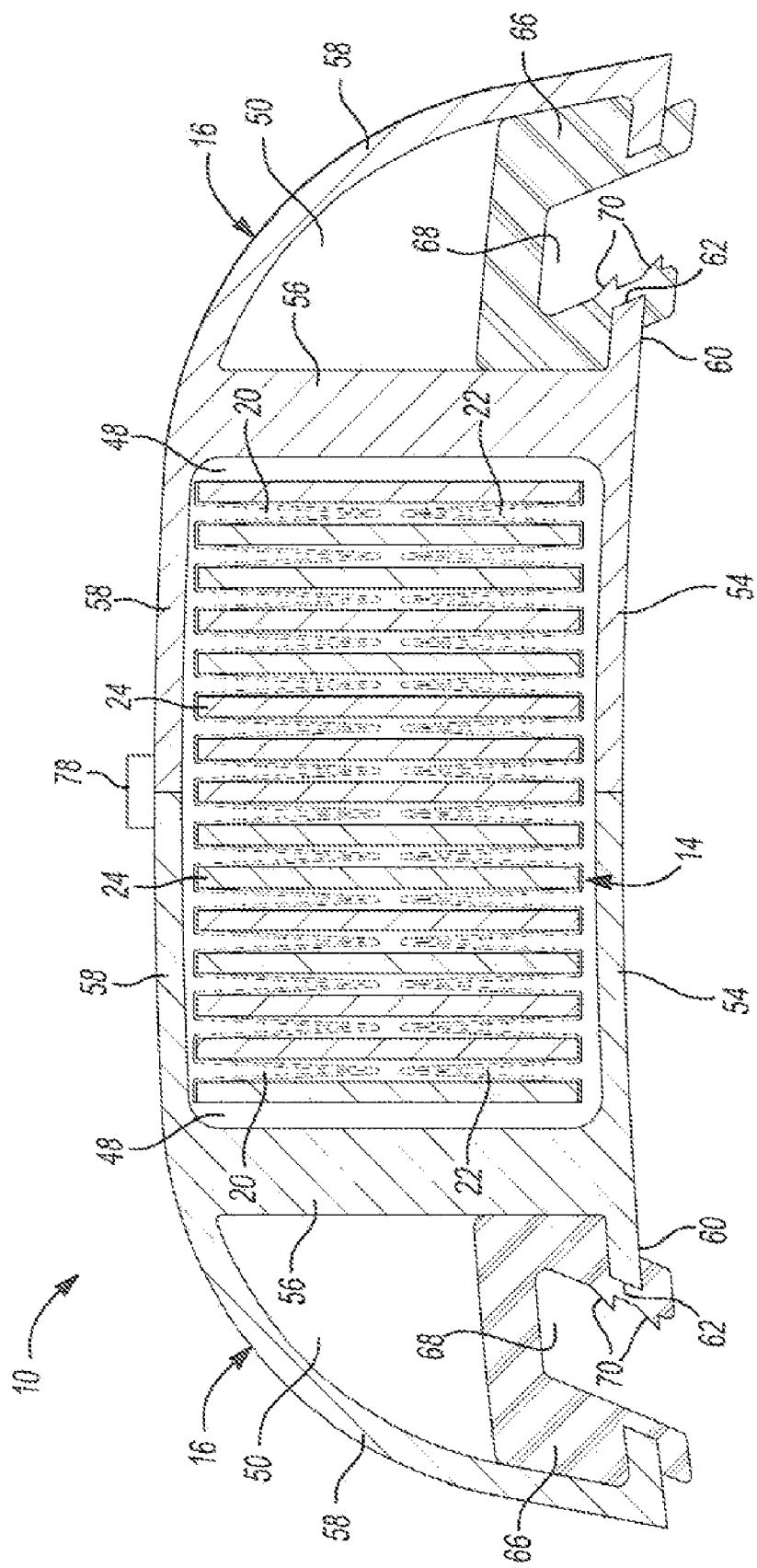
FIG. 4 is a cross-section of the closure system of FIG. 1 showing a pair of support members and a closure panel in an open position.

As noted above, the closure system 10 may include a single closure panel 14 extending between a pair of support members 16 or may include multiple closure panels 14 extending between a pair of support members 16. If the closure system 10 includes a single closure panel 14 extending between a pair-of support members 16, the top panel 20 and the bottom panel 22 may include a single panel that extends between and is attached to a first support member 16 and a second support member 16, if the closure system 10 includes multiple closure panels 14, a first closure panel 14 would be associated with a first support member 16 and a second closure panel 14 would be associated with another support member. In either configuration, when the closure panel or closure panels 14 are positioned in the open position, the support members 16 are positioned adjacent to one another, as shown in FIG. 4. When the support members 16 are brought in close proximity with one another, the single closure panel 14 or multiple closure panels 14 may be folded into an accordion shape and received within the respective channels 48 of the support members 16.

When the closure system 10 is positioned in the open position such that the closure panel 14 is in the open position and is disposed generally within the channels 48 of the support members 16, the support members 16 may be in an abutting relationship such that the folded closure panel 14 or closure panels 14 are hidden from view. A locking mechanism 78 may be associated with one or both support members 16 and may be positioned on one or both of the fop extensions 52 and bottom extensions 54 of the support members 16 to attach the support members 16 to one another when the closure panel 14 is in the open position.

As noted above, the box sections 50 of each support member 16 improve the overall structure of the vehicle 12 when the closure panel 14 is positioned in the closed position. Similarly, when the closure panel 14 is moved from the dosed position to the open position and the support members 16 are joined at a middle portion of the vehicle 12, the support members 16 similarly improve the structure of the vehicle 12 by attaching a portion of the vehicle roof 18 forward of the closure system 10 to a rearward portion of the vehicle roof 18 aft of the closure system 10. Tying the fore and aft sections of the vehicle roof 18 to one another when the closure system 10 is in the open position improves the strength and overall structure of the vehicle roof 18 and, thus, the vehicle 12, in general.

With reference to FIGS, 1, 4, 6, and 7, operation of the closure system 10 will be described in detail. When the closure system 10 is in the closed position (FIG. 1), the support members 16 are at an outermost position of the vehicle roof 18 and the closure panel 14 extends generally between the support members 16 and is placed under tension to prevent debris from entering the interior compartment 26 of the vehicle 12. While the closure system 10 may include more than one closure panel 14 extending between the pair of support members 16, operation of the closure system 10 will be described with the closure system 10 including a single closure panel 14 extending between a pair of support members 16. Furthermore, while the closure system 10 could be a manually operated closure system, operation of the closure system 10 will be described as a powered closure system including an electric motor 44 and a series of cables 46.

The motor 44 must be energized to drive the cables 46 relative to the vehicle roof 18 to open the closure system 10. Energizing the motor 44 may include rotating a dial or depressing a pushbutton (neither shown) to connect the motor 44 to a power source (not shown). Energizing the motor 44 applies a force to the cables 46 to move the support members 16 relative to the vehicle 12.

If the support members 16 include box sections 50 having a bottom surface 60 that receives a glass panel 64 within a seal 66, rotation of the actuation lever or depression of the pushbutton may first energize a control system associated with the glass panel 64 to first remove the glass panel 64 from the seal 66 of each support member 16. Specifically, the control system associated with the glass panel 64 will drop the glass panel 64 and remove the glass panel 64 from the recess 68 of the seal 66 to permit movement of the support members 16 relative to the glass panel 64 without causing damage to the glass panel 64.

While rotation of the actuation lever or depression of the pushbutton is described as sending a signal to a control system associated with the glass panel 64, rotation of the actuation lever or depression of the pushbutton may directly cause the glass panel 64 to drop and be removed from the recess 68 of the seal 66. Rotation of the lever or depression of the pushbutton may be directly coupled to a motor (not shown) associated with the glass panel 64 such that when the actuation lever is rotated or the pushbutton is depressed, the motor associated with the glass panel 64 causes the glass panel 64 to move relative to the support members 16 such that the glass panel 64 is retracted from the seal 88. As described above, if the support members 16 include a seal 72 having a bulbous section 74 in contact with the glass panel 64, movement of the support members 16 relative to the vehicle 12 is permitted without communication between actuation of the closure system 10 and a control system or motor associated with the glass panel 64.

Once the glass panel 64 has been removed from the recess 64 of the seal 66, movement of the support members is permitted. Movement of the support members 16 from the closed position to the open position causes the top panel 20 and bottom panel 22 to be folded into an accordion shape. Folding the top panel 20 and bottom panel 22 into an accordion shape also brings the plurality of structural supports 24 of the closure panel 14 into close proximity to one another such that the structural supports 24 are essentially stacked within the support members 16 (FIG. 4). Sufficient movement of the support members 16 from the closed position to the open position causes the fop panel 20 and bottom panel 22 to be sufficiently compressed such that the structural supports 24 are in close proximity to one another and the folded top panel 20 and folded bottom panel 22 along with the stacked structural supports 24 are received within the channels 48 of the support members 16.

Positioning the top panel 20, bottom panel 22, and structural supports 24 within the channels 48 of the support members 16 essentially hides the top panel 20, bottom panel 22, and structural supports 24 from view when the closure panel 14 and support members 16 are in the open position. Once the top panel 20, bottom panel 22, and structural supports 24 are disposed within the channels 48 of the support members 16, the locking mechanism 78 may be actuated to lock the support members 16 together. The locking mechanism 78 may also be remotely actuated via the actuation lever or pushbutton or, alternatively, may be a manually operated locking mechanism such as a latch or other mechanical fastener (neither shown).

Once the support members 16 are joined generally at a mid-portion of the vehicle 12 and are attached to one another by the locking mechanism 78, the closure system 10 is in the open position. Positioning the closure system 10 in the open position opens the interior compartment 26 of the vehicle 12.

To return the closure system 10 to the closed position, a force must be applied to the actuation lever or pushbutton to rotate the actuation lever or depress the pushbutton and once again energize the motor 44. Rotation of the actuation lever or depression of the pushbutton may first release the locking mechanism 78 to permit movement of the support members 16 relative to the vehicle 12. If the locking mechanism 78 is a manual locking mechanism (i.e., a latch or fastener), the manual locking mechanism 78 must first be released prior to energizing the motor 44 of the closure system 10.

Once the locking mechanism 78 is released and the support members 16 are free to move relative to the vehicle 12, the actuation lever may be rotated or the pushbutton may be depressed to energize the motor 44 and drive the cables 46 relative to the vehicle 12. Driving the cables 46 relative to the vehicle 12 applies a force to the closure panel 14 and support members 16 to drive the support members 16 and closure panel 14 relative to the vehicle 12 from the open position to the closed position. The motor 44 of the closure system 10 will remain energized until the support members 16 are in the closed position and the closure panel 14 is similarly in the closed position. As noted above, returning the closure panel 14 to the closed position includes applying a force to the closure panel 14 and placing the closure panel 14 under tension. Placing the closure panel 14 under tension allows the closure panel 14 to repel debris as well as to engage and form the seal 38 disposed on the top surface 40 of the track 36. Depressing the seal 38 disposed on the top surface 40 of the track 36 improves the sealing ability of the closure system 10 relative to the vehicle roof.

Returning the closure panel 14 to the closed position may also cause the glass panel 64 to extend into the recess 68 of the seal 66 to create a seal between the glass panel 64 and the respective box sections 50 of the support members 16. A signal may be sent from a control system of the closure system 10 to a control system or a motor associated with the glass panel 64 to move the glass panel 64 into engagement with the seal 66 of each box section 50 once the support members 16 are fully returned to the closed position. This way, returning the glass panel 64 into engagement with the seal 66 may be timed with return of each support member 16 to the closed position.

Figure 7:
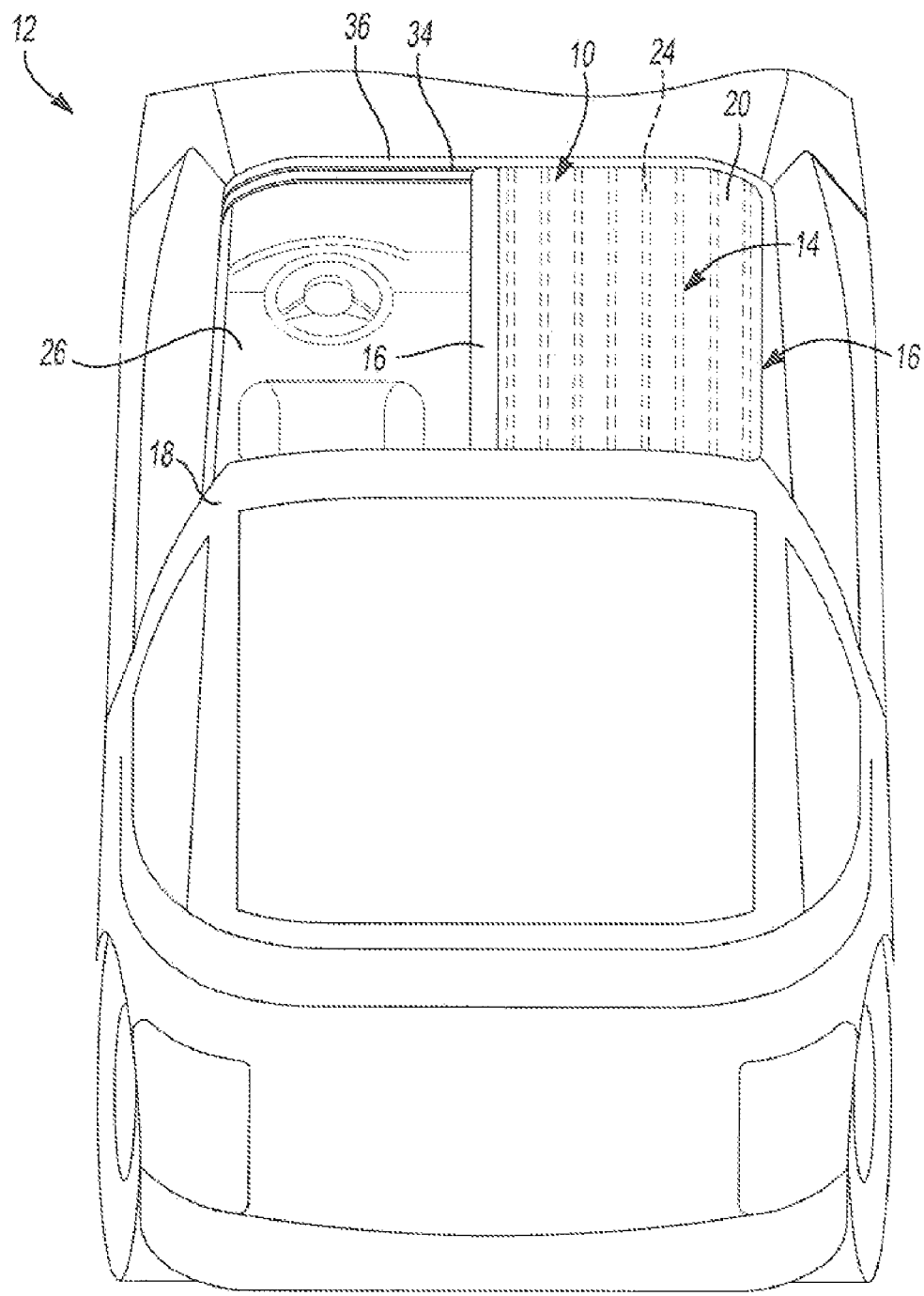
FIG. 7 is a perspective view of the vehicle of FIG. 1 with one of the closure panels of the closure system of FIG. 1 in an open position.

While the closure system 10 is described as being movable between a closed position (FIG. 1) and an open position (FIG. 6), the closure system 10 may be partially open such that only a portion of the interior compartment 26 is exposed. With reference to FIG. 7, the closure system 10 is shown in a partially open state with one of the support members 16 moved info an open position with the other support member 16 remaining in the closed position. By moving only one of the support members 16 relative to the vehicle 12, only a portion of the interior compartment 26 of the vehicle 12 is exposed.

Figure 8:
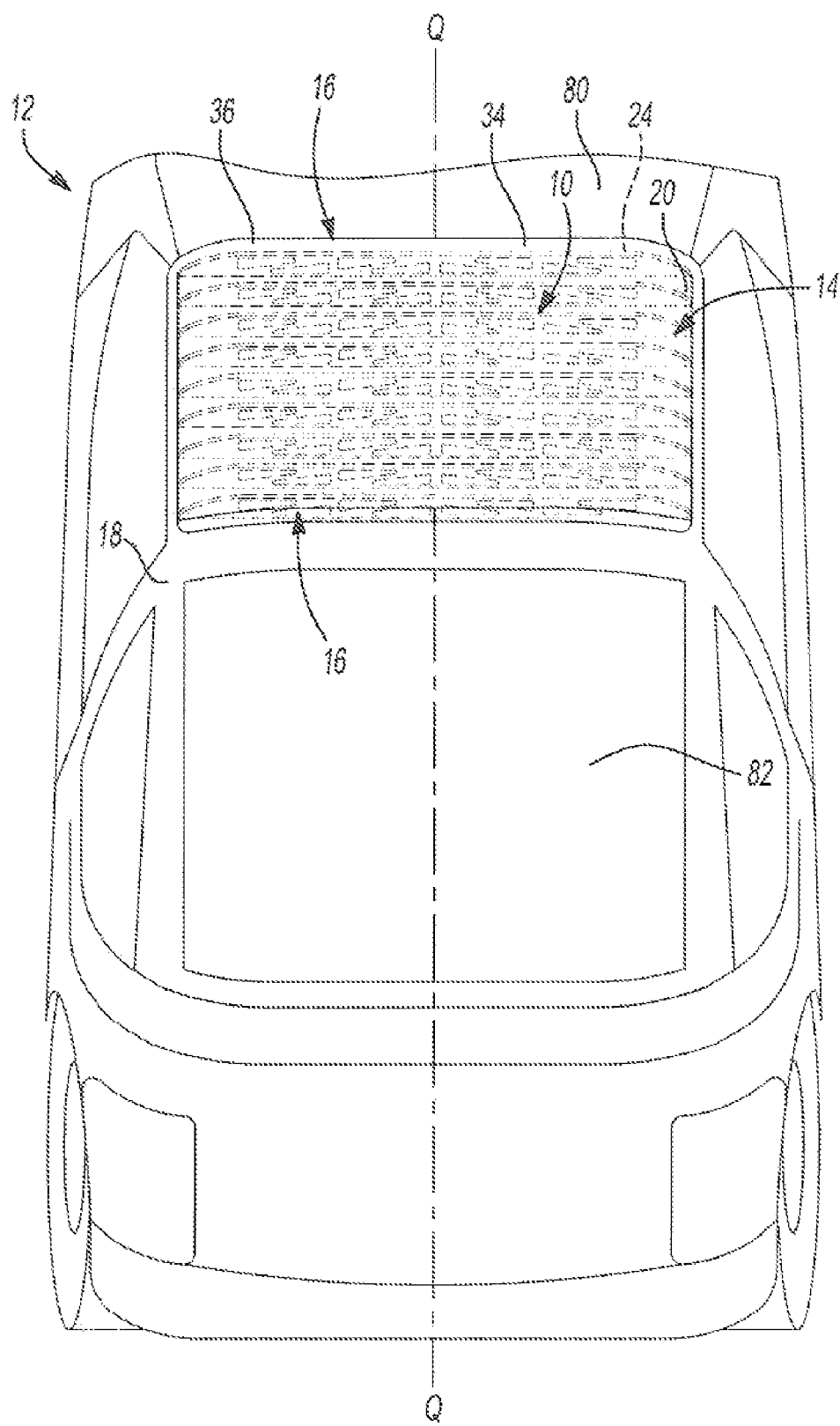
FIG. 8 is a perspective view of a vehicle incorporating a closure system in accordance with the principles of the present invention.

With reference to FIG. 8, the closure system 10 is shown as being incorporated into a vehicle 12 such that the support members 16 move in a fore/aft direction relative to the vehicle 12 rather than moving transversely as shown in FIGS. 1-7. In this configuration, one of the support members 16 is disposed proximate to a junction between the vehicle roof 18 and a vehicle windshield 80 while the other support member 16 is disposed proximate to a junction of the vehicle roof 18 and a rear window 82 of the vehicle 12. When the closure system 10 of FIG. 8 is actuated, the support members 16 move toward a central portion of the vehicle such that the structural members extend in a direction generally perpendicular to a longitudinal axis Q of the vehicle 12. Positioning the closure system 10, as shown in FIG. 8, permits completely opening a front passenger compartment of the vehicle 12 and/or completely opening a rear passenger compartment of the vehicle 12.

Figure 9:
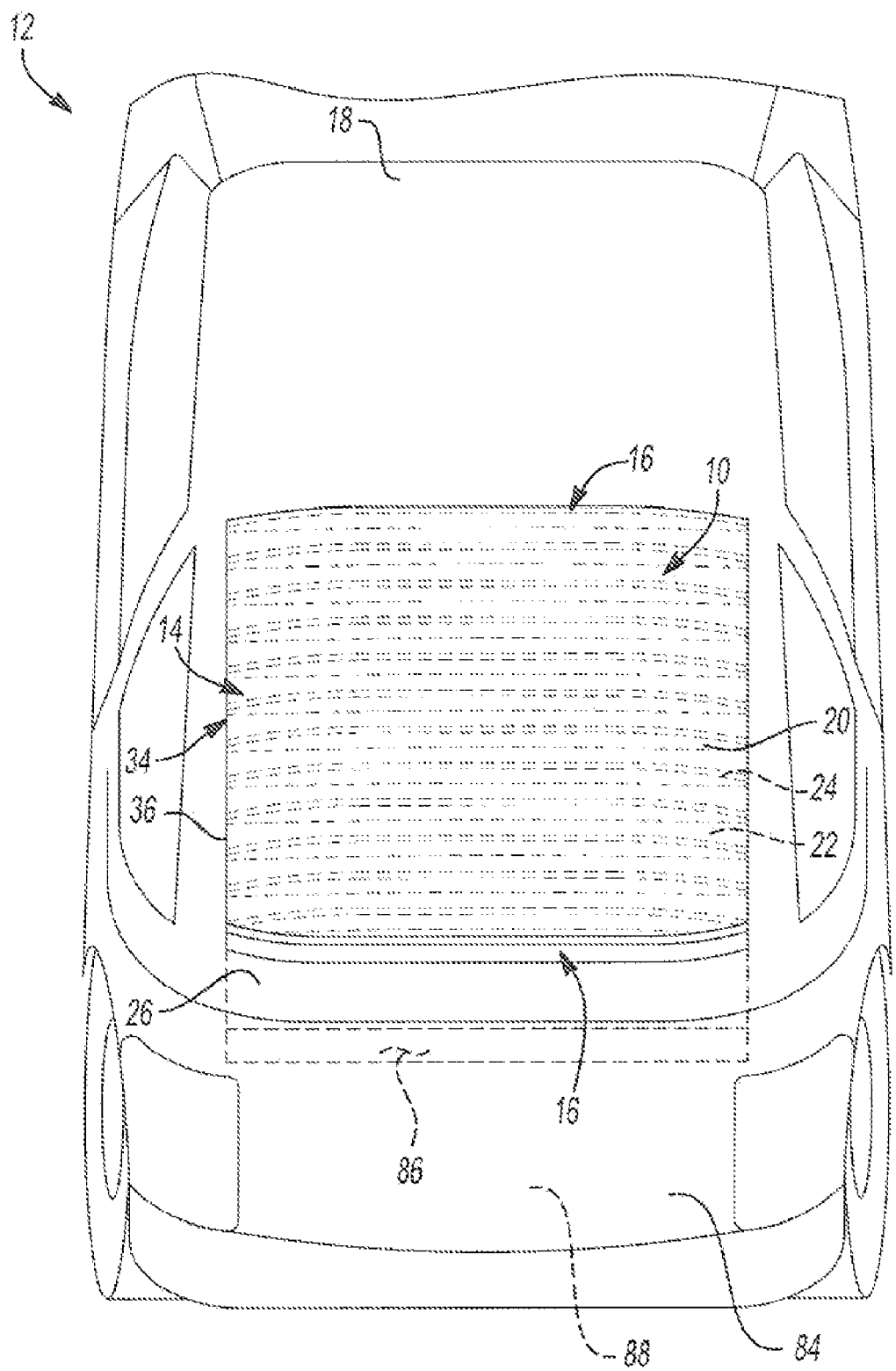
FIG. 9 is a perspective view of a closure system in accordance with the principles of the present invention.

With reference to FIG. 9, the closure system 10 of the present invention is shown as being associated with a rear closure panel 84 of the vehicle 12 such as a lift gate. Because the closure system 10 may include a top panel 20 and a bottom panel 22 being formed of a transparent material, the closure system 10 of the present invention may replace a rear window of a vehicle 12, as shown in FIG. 9. When the closure system 10 is in the closed position, one of the support members 16 is sealed against the vehicle roof 18 while the other support member 16 is sealed against a top surface 68 of the rear closure panel 84.

When the closure system 10 is actuated into the open position, the support member 16 disposed proximate to the vehicle roof 18 may be actuated and moved toward the support member 16 disposed proximate to the rear closure panel 84. Alternatively, the support member 16 disposed proximate to the rear closure panel 84 may be moved toward the support member 16 disposed proximate to the vehicle roof 18 to open a rear end portion of the vehicle 12. In either configuration, movement of the support members 16 relative to the vehicle 12 opens the rear portion of the vehicle generally between the vehicle roof 18 and the rear closure panel 84.

When the closure system 10 of FIG. 9 is actuated into the open position, each support member 16 could be movable relative to the vehicle 12. Such a configuration would allow the support members 16 to each move and be received within a recess 88 of the rear closure panel 84. Positioning the closure system 10 within the recess 88 of the rear closure panel 84 removes the closure system 10 from view when the closure system 10 is in the open position.

Figure 10:
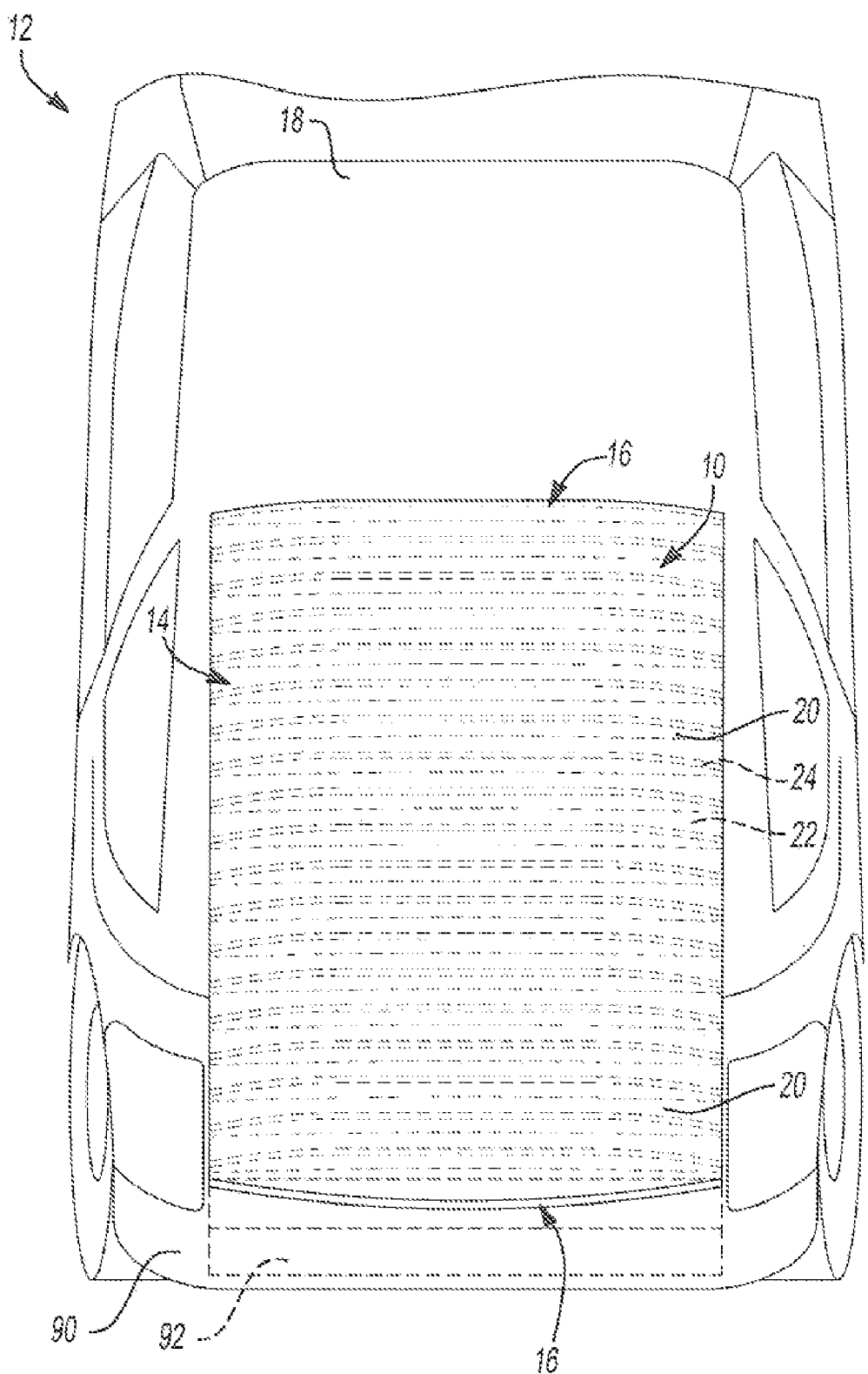
FIG. 10 is a perspective view of a vehicle incorporating a closure system in accordance with the principles of the present invention.

With particular reference to FIG. 10, the closure system 10 is shown as being associated with a rear portion of the vehicle 12. The closure system 10 may be moved between an open position that exposes a rear portion of the vehicle 12 and a closed position which seals the interior compartment 26 of the vehicle 12 at a rear portion of the vehicle 12. Because the closure system 10 may include a top panel 20 and a bottom panel 22 that is formed from a transparent material, the closure system 10 may be used as a combination lift gate/rear window that is movable between an open position and a closed position. The closure system 10 of FIG. 10 may include a support member 16 disposed proximate to the vehicle roof and a support member 16 that is disposed proximate to a rear bumper 90 of the vehicle 12.

Each of the support members 16 are movable relative to the vehicle 12 such that the closure system 10 may be opened either from a bottom portion (i.e., proximate to the bumper 90) or from a top portion (i.e., proximate to the vehicle roof 18), if the closure system 10 is opened from a top portion (i.e., proximate to the vehicle roof 18), the support members 16 disposed proximate to the vehicle roof 18 may be moved relative to the vehicle 12 and info contact with the support member 16 disposed proximate to the bumper 90. Once the support members 16 are in contact, the support members 16 may be moved together with the closure panel 14 and positioned within the channels 48 of each support member 16 and into a recess 92 of the rear bumper 90. Positioning the support members 16 within the recess 92 of the rear bumper 90 hides the support members 16 and closure panel 14 from view when the closure system 10 is in the open position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A closure system for a vehicle comprising:
    a closure member movable relative to the vehicle between an open position and a closed position and including a flexible panel and a plurality of structural supports supporting said flexible panel;
    a first support member attached to and movable with said closure member between said open position and said closed position, said first support member including a recess receiving said flexible panel and said plurality of structural supports therein when said closure member is in said open position;
    a second support member attached to and movable with said closure member between said open position and said closed position, said second support member including a recess receiving said flexible panel and said plurality of support members therein when said closure member is in said open position.

2. The closure system of claim 1, wherein said closure member is folded and received within said first support member in said open position.

3. The closure system of claim 1, wherein said flexible panel is one of transparent or translucent.

4. The closure system of claim 1, wherein said flexible panel is folded and said plurality of structural supports are stacked when said closure member is in said open position, said folded flexible panel and said stacked structural supports being received within said recess when said closure panel is in said open position.

5. The closure system of claim 1, wherein said first support member includes a sealing system far receiving a window glass of the vehicle.

\* \* \* \* \*